(12) United States Patent
Lieberman et al.

(10) Patent No.: US 11,263,633 B2
(45) Date of Patent: Mar. 1, 2022

(54) SYSTEMS AND METHODS FOR BIOMETRIC PAYMENTS

(71) Applicant: JPMORGAN CHASE BANK, N.A., New York, NY (US)

(72) Inventors: Alex Lieberman, Marlboro, NJ (US); Nicholas M. LoRe, Pearl River, NY (US)

(73) Assignee: JPMORGAN CHASE BANK, N.A., New York, NY (US)

(*) Notice: Subject to any disclaimer, the term of this patent is extended or adjusted under 35 U.S.C. 154(b) by 543 days.

(21) Appl. No.: 14/980,513

(22) Filed: Dec. 28, 2015

(65) Prior Publication Data
US 2017/0186011 A1 Jun. 29, 2017

(51) Int. Cl.
*G06Q 20/40* (2012.01)
(52) U.S. Cl.
CPC .............. *G06Q 20/40145* (2013.01)
(58) Field of Classification Search
None
See application file for complete search history.

(56) References Cited

U.S. PATENT DOCUMENTS

| 8,799,088 | B2 | 8/2014 | Rothschild |
| 2008/0201769 | A1 | 8/2008 | Finn |
| 2008/0319905 | A1* | 12/2008 | Carlson ............... G06Q 40/02 705/44 |
| 2012/0209630 | A1* | 8/2012 | Ihm .................... G06Q 20/02 705/4 |
| 2015/0058215 | A1 | 2/2015 | Johnson |
| 2015/0081550 | A1* | 3/2015 | Priebatsch ....... G06Q 20/40145 705/44 |
| 2015/0142673 | A1* | 5/2015 | Nelsen ............ G06Q 20/405 705/76 |
| 2015/0154597 | A1 | 6/2015 | Bacastow |
| 2015/0339648 | A1 | 11/2015 | Kushevsky et al. |
| 2016/0012465 | A1* | 1/2016 | Sharp ................ G06Q 20/18 705/14.17 |

OTHER PUBLICATIONS

PCT International Search Report and Written Opinion, International Application No. PCT/US16/68790, dated Mar. 16, 2017, pp. 1-9.

* cited by examiner

*Primary Examiner* — Jason Borlinghaus
(74) *Attorney, Agent, or Firm* — Greenberg Traurig LLP

(57) ABSTRACT

Systems and methods for biometric payments are disclosed. In one embodiment, a method for biometric payments may include (1) receiving transaction information from a merchant terminal, the transaction information comprising an identification of a good or service to purchase and a biometric payment instruction; (2) at least one computer processor authenticating the individual based on the biometric payment instruction; (3) the at least one computer processor determining a payment account from the biometric payment instruction; (4) the at least one computer processor retrieving a payment device associated with the payment account; and (5) the at least one computer processor providing the payment device to the merchant terminal.

12 Claims, 9 Drawing Sheets

SYSTEMS AND METHODS FOR BIOMETRIC PAYMENTS

BACKGROUND OF THE INVENTION

1. Field of the Invention

The present invention generally relates to systems and methods for biometric payments.

2. Description of the Related Art

Presently, when an in-person payment is made, a physical device of some sort is normally required to identify the transaction account. Biometric data may be used to authenticate the account holder.

SUMMARY OF THE INVENTION

Systems and methods for biometric payments are disclosed. In one embodiment, a method for biometric payments may include (1) receiving transaction information from a merchant terminal, the transaction information comprising an identification of a good or service to purchase and a biometric payment instruction; (2) at least one computer processor authenticating the individual based on the biometric payment instruction; (3) the at least one computer processor determining a payment account from the biometric payment instruction; (4) the at least one computer processor retrieving a payment device associated with the payment account; and (5) the at least one computer processor providing the payment device to the merchant terminal.

In one embodiment, the transaction information may include at least one of a terminal identifier and a merchant identifier.

In one embodiment, the biometric payment instruction may include audio and/or video of the individual speaking a payment instruction. The video may include a plurality of images.

In one embodiment, the biometric payment instruction may include a payment account issuer and a payment account identifier for the payment account.

In one embodiment, the payment device may be retrieved from an issuer of the payment account.

In one embodiment, the payment device that is associated with the payment account may include one or more of a payment token, payment instructions, the terminal identifier, and the merchant identifier.

According to another embodiment, a method for biometric payments may include (1) a back end system receiving transaction information from a merchant, the transaction information comprising an identification of a good or service to purchase and a biometric payment instruction; (2) at least one back end computer processor authenticating the individual based on the biometric payment instruction; (3) the at least one computer processor determining a payment account issuer from the biometric payment instruction; (4) the payment account issuer receiving, from the back end system, the transaction information; (5) at least one payment account issuer computer processor determining a payment account from the biometric payment instruction; (6) the at least one payment account issuer computer processor retrieving a payment device associated with the payment account; and (7) the at least one computer processor providing the payment device to at least one of the merchant terminal and the back end system.

In one embodiment, the transaction information may include at least one of a terminal identifier and a merchant identifier.

In one embodiment, the biometric payment instruction may include audio and/or video of the individual speaking a payment instruction. The video may include a plurality of images.

In one embodiment, the biometric payment instruction may include a payment account issuer and a payment account identifier for the payment account.

In one embodiment, the payment device that is associated with the payment account may include one or more of a payment token, payment instructions, the terminal identifier, and the merchant identifier.

In another embodiment, a system for biometric payments may include a merchant terminal, a back end system, and a financial institution system.

The merchant terminal may include a point of sale device that receives an identification of a good or service to purchase, an audio capture device that captures audio of an individual speaking a payment instruction, and an image/video capture device that captures an image or video of the individual speaking the payment instruction.

The back end system may include at least one computer processor that receives the identification of the good or service, the audio, and the image or video from the merchant terminal, and may authenticate the individual based on at least one of the audio and image or video of the individual speaking the payment instruction and determine a payment account based on at least one of the audio and image or video of the individual speaking the payment instruction;

The financial institution system may be associated with the payment account and may include at least one computer processor that receives the identification of the good or service, the audio, and the image or video from the back end, and may retrieve a payment device associated with the payment account and provide the payment device to the merchant terminal.

In one embodiment, the merchant terminal may also provide one of a terminal identifier and a merchant identifier to the back end.

In one embodiment, the payment device that is associated with the payment account may include one or more of a payment token, payment instructions, the terminal identifier, and the merchant identifier.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
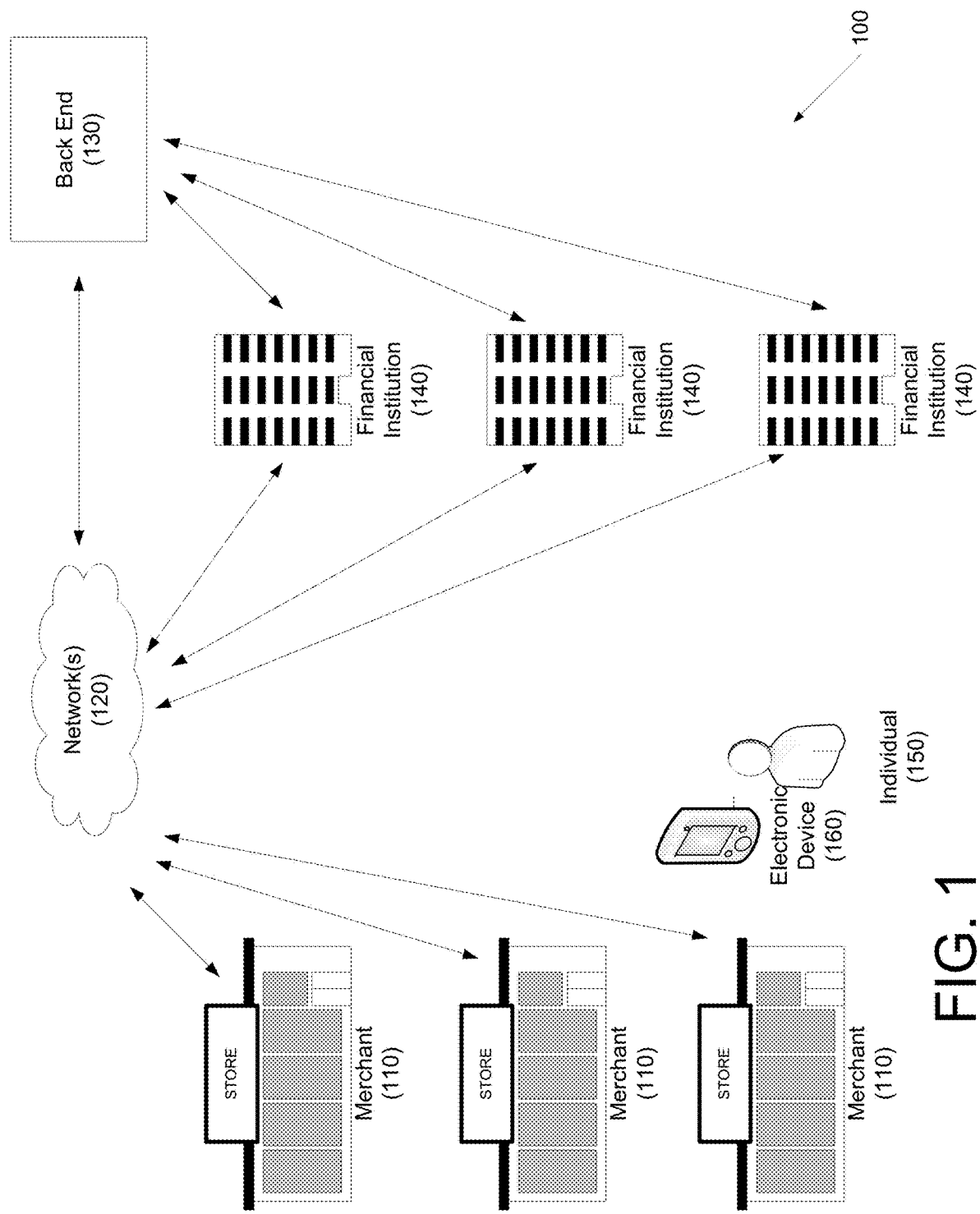
FIG. 1 depicts a system for in-person biometric payment according to one embodiment.

Several embodiments of the present invention and their advantages may be understood by referring to FIGS. 1-9.

Embodiments disclosed herein relate to systems and methods for biometric payments.

The use of biometric data from an individual—such as the individual's face, facial features, voice, fingerprint, palm print, hand geometry, odor/scent, gait, gestures, thermal signature, etc. may be used to identify that individual. The use of a biometric alone, however, is not entirely secure. For example, a photo of an individual can used to fool face recognition sensors. A voice can be recorded and replayed to fool voice recognition systems.

In addition, some individuals are reluctant to use certain biometrics, such as fingerprints. Nevertheless, even if an individual consents to the use of fingerprints, the acquisition of fingerprints is prone to error.

A combination of biometrics may be used to increase the reliability of such authentication. For example, in one embodiment, a moving image (e.g., a video) may be used to authenticate an individual. In addition, a voice command may be received as part of the moving image, and may be used to authenticate the individual. In addition, an individual may be instructed to perform a certain gesture (e.g., winking, smiling, etc.), repeat a certain phrase, etc. in order to minimize the possibility of spoofing.

Embodiments here in are directed to using a combination of an individual's biometrics, such as the individual's voice and facial features from a moving image, to authenticate an individual conducting an in-person transaction. In one embodiment, an individual may identify one or more goods or services to purchase. The individual may be presented to an image capture device and a microphone, and may be prompted to provide payment instructions, such as "I would like to pay using my Freedom Credit Card." The image capture device may capture a moving image of the individual saying this phrase, and the microphone may capture the individual's voice.

In one embodiment, the cashier, for example, may prompt the individual to recite the payment instruction.

In one embodiment, the recitation of a certain phrase, such as paying via a credit or debit instrument, may initiate processing on the image and voice, whereas the recitation of other phrases, such as "I am paying with cash" may not initiate such processing, unless, for example, the individual would like to receive a digital receipt.

The captured moving image and the recorded voice may be provided to a back-end. In one embodiment, the back end may store biometric data for a plurality of individuals, and may identify the desired transaction account and authenticate the individual using the moving image and/or voice recording. The back-end may provide, for example, a payment token to the merchant to effect payment.

In another embodiment, the back-end may authenticate the individual based on the captured moving image and/or voice recording, and may then request payment from the issuer. The issuer may then provide, for example, a payment token to the merchant.

In another embodiment, the back-end may identify a financial instrument issuer from the recited phrase, and may provide the captured moving image and/or voice recording to the issuer. The issuer may then identify the account and authenticate the individual, and may provide payment to the merchant.

Once the transaction is complete, the back-end may provide a digital receipt to the individual. In one embodiment, the digital receipt may be stored for the individual.

Referring to FIG. 1, a system for in person biometric payments is disclosed. In one embodiment, system 100 may include merchants 110, financial institutions 140, one or more network 120, and back end 130. Although three merchants 110 and three financial institutions 140 are depicted, it should be recognized that greater or fewer merchants and/or may be provided as is necessary and/or desired.

In one embodiment, individual 150 may shop in person, or on line, at merchant 110. In one embodiment, individual may shop using electronic device 160, which may be any suitable electronic device (e.g., desktop computer, laptop computer, notebook computer, tablet computer, smart phone, PDA, etc.).

In one embodiment, electronic device 160 may execute a payment wallet, a payment application, an authentication application, etc.

In one embodiment, merchants 110 may communicate with back end 130 via network(s) 120. In one embodiment, network(s) 120 may be any suitable network and/or combination of networks, including communication networks, payment networks, etc.

Financial institutions 140 may communicate with back end 130 directly, via network(s) 120, etc., or by any mechanism as is necessary and/or desired.

In one embodiment, back end 130 may be a token vault. In one embodiment, the token vault may maintain a mapping of a token numbers to primary account numbers.

In one embodiment, although not depicted, one or more merchant 110 may communicate with one or more financial institution 140 directly.

Figure 2:
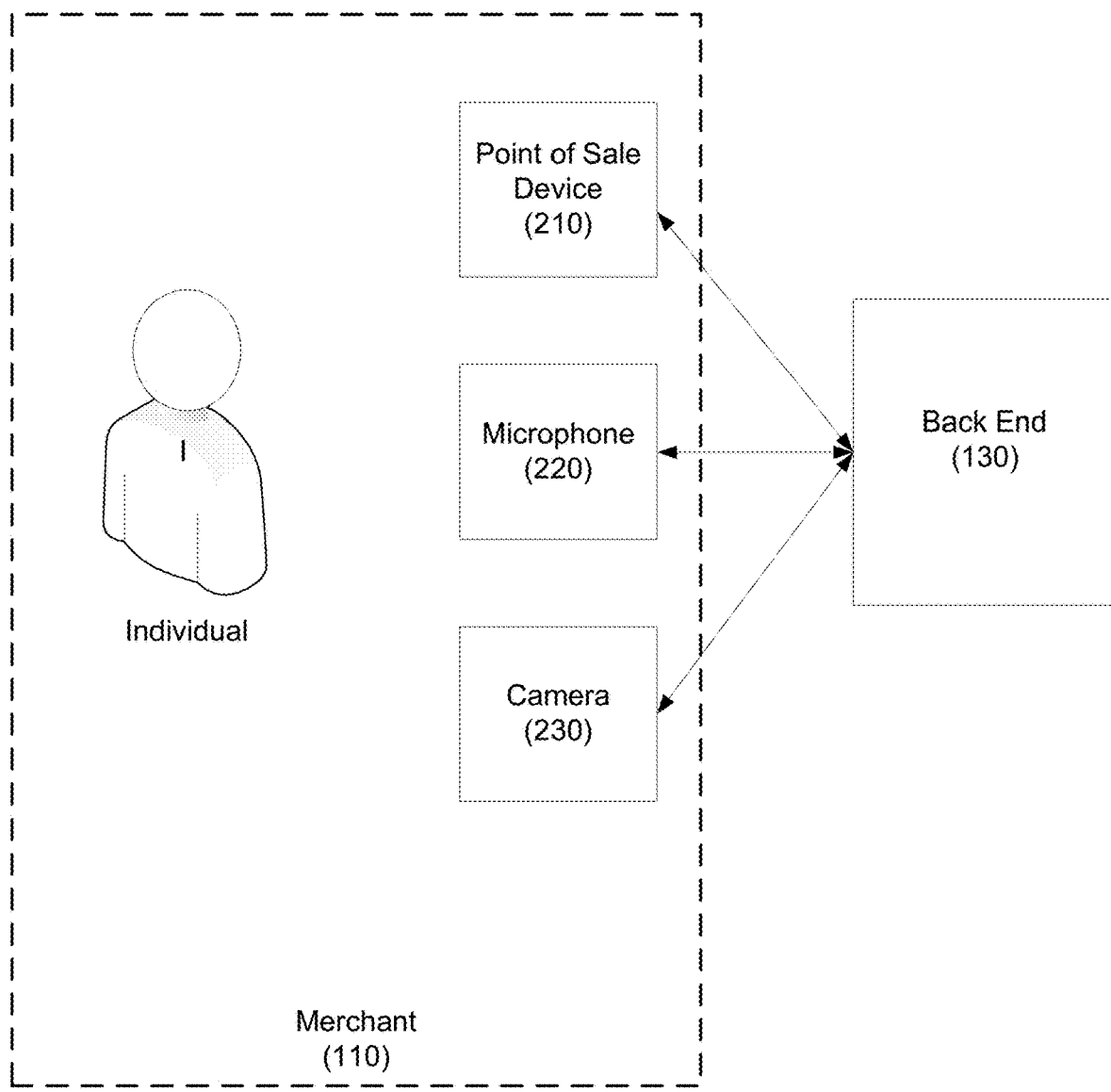
FIG. 2 depicts a system for in-person biometric payment according to one embodiment.

Referring to FIG. 2, a system for in person biometric payments is disclosed. Merchant 110 may include one or more of point of sale device 210, microphone 220, and camera or other image capture device 230. In one embodiment, point of sale device 210 may be a conventional point of sale device, and may facilitate payments using physical transaction devices (e.g., physical credit/debit cards, electronic wallets, etc.).

Microphone 220 may be any suitable device to capture sound from the individual. Camera 230 may be any suitable image capture device that may capture an image, a series of images, or video, of the individual.

Additional biometric capture devices, such as fingerprint scanners, palm scanners, eye scanners, etc. may be provided as is necessary and/or desired.

In one embodiment, point of sale device 210, microphone 220, and/or camera 230 may communicate with back-end 130. In one embodiment, the communication may be via one or more communication network, payment network, etc.

Figure 3:
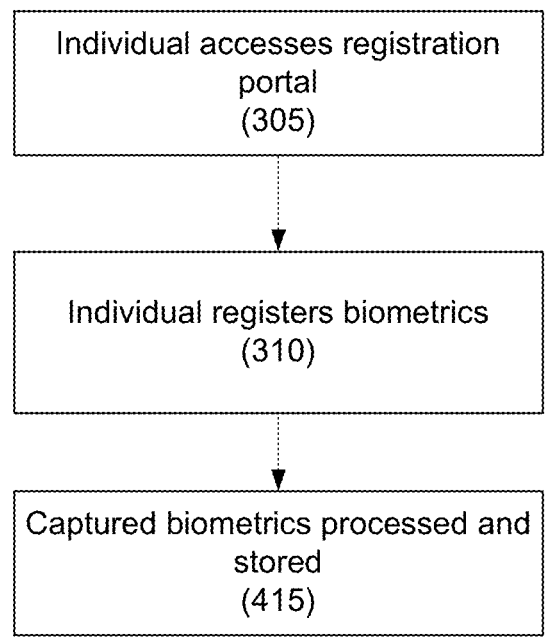
FIG. 3 depicts a method for biometric registration according to one embodiment.

Referring to FIG. 3, a method for biometric registration is disclosed.

In step 305, an individual may access a registration portal via a kiosk, the individual's mobile device, etc. In one embodiment, the registration portal may be provided by the back end (e.g., a token vault). In another embodiment, the registration portal may be provided by a financial institution, such as a financial instrument issuer. In still another embodiment, the registration portal may be provided by a merchant.

Any combination of the back end, financial institution, or merchant may provide the registration portal.

In one embodiment, the individual may be authenticated prior to beginning the registration process. This may involve, for example, using a registered mobile device, out of band authentication, in-person registration, etc.

In step 310, the individual may register one or more biometrics using the registration portal. For example, to register the individual's voice, the individual may be asked to register his or her voice, and may repeat sounds, letters, numbers, words, and/or phrases. In one embodiment, the individual may register his or her voice when registering facial biometrics obtained while the individual is speaking. For example, an image/images/video of the individual speaking may be captured, and that video may be processed to register the individual's voice as well as the individual's facial features, gestures, etc.

Examples of biometric registration are disclosed in U.S. patent application Ser. No. 13/908,618; U.S. patent application Ser. No. 13/972,556; U.S. patent application Ser. No. 14/010,06; U.S. patent application Ser. No. 14/077,869; and U.S. patent application Ser. No. 14/189,608. The disclosures of each of these documents is hereby incorporated, by reference, in its entirety.

In step 315, the captured biometrics may be processed and stored.

Figure 4:
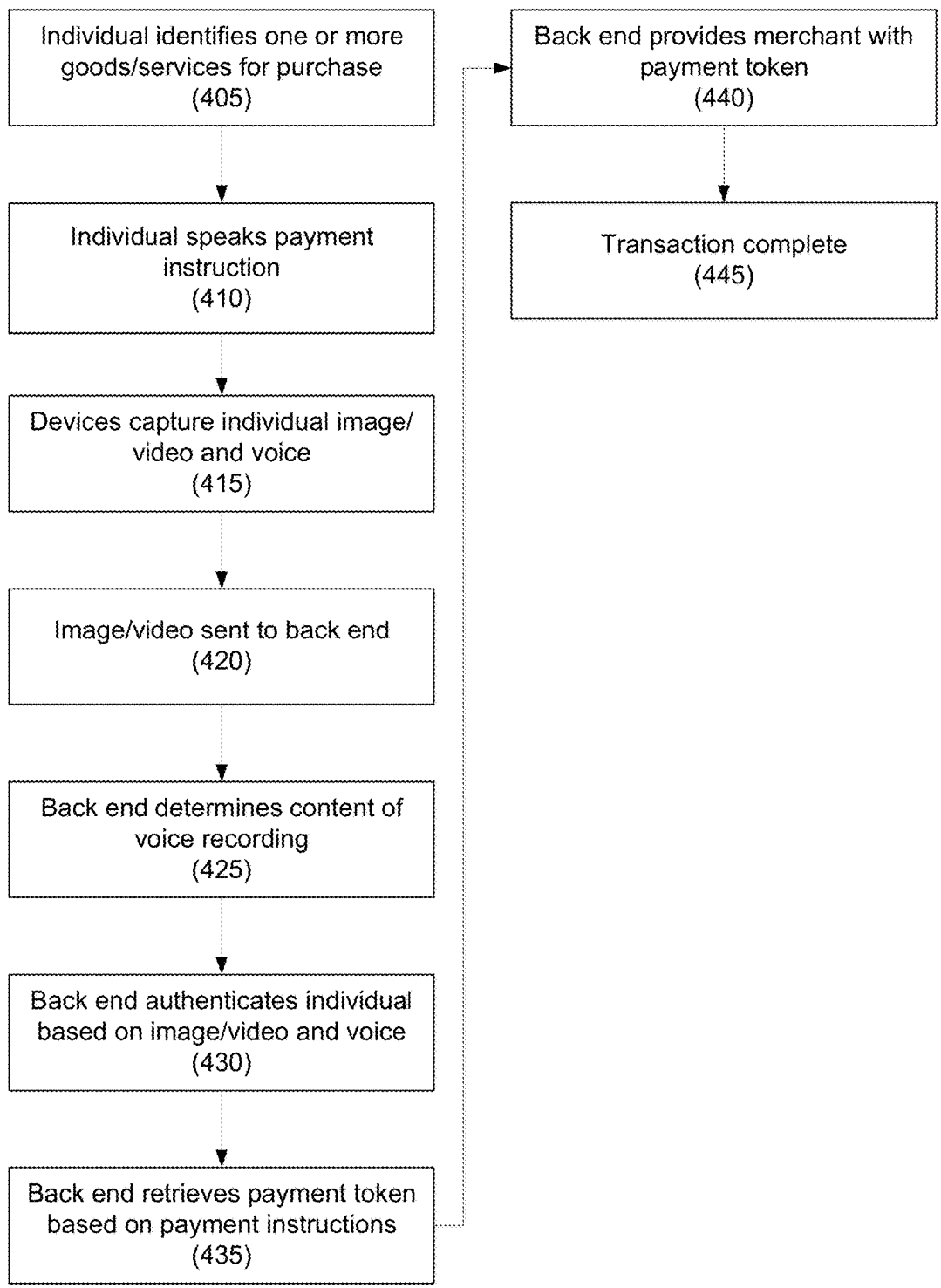
FIG. 4 depicts a method for in-person biometric payment according to one embodiment.

Referring to FIG. 4, a method for in-person biometric payments is disclosed according to one embodiment. In step 405, the individual may identify one or more goods and/or services to purchase. In one embodiment, the individual may present the items to a cashier, self-scanning kiosk, etc. In still another embodiment, the individual may add the item(s) to his or her shopping cart using, for example, the individual's mobile device.

An example of using one's mobile device to facilitate shopping is disclosed in U.S. Patent Application Ser. No. 62/182,171, the disclosure of which is incorporated, by reference, in its entirety.

In step 410, the individual may speak a payment instruction in front of a microphone and/or image capture device. In one embodiment, the individual may be prompted to speak the payment instruction by, for example, a cashier (e.g., "How would you like to pay for this transaction?").

In one embodiment, the payment instruction may include an instruction (e.g., "I would like to pay"), an issuer or payment facilitator (e.g., "using my Chase"), and an identification of a payment device (e.g., "credit card").

In another embodiment, the individual may indicate that he or she wishes to pay using cash or check. Such identification may not require further processing beyond the recognition of these payment methods.

In step 415, the image capture device and/or the microphone captures the image/plurality of images/video and audio of the individual speaking the payment instruction.

In one embodiment, the individual's electronic device may be used to capture the image/video and the audio from the individual. The electronic device may provide some or all of this data to the merchant terminal/point of sale device, to the back end, or to the financial institution as is necessary and/or desired.

In one embodiment, the individual's electronic device may provide an identifier for the individual, an account, etc. in order to decrease the number of biometric profiles to check against. This may be provided by, for example, NFC.

In step 420, the captured image/images/video and audio recording may be provided to the back end. In one embodiment, the terminal, point of sale device, etc. may provide a terminal token or other identifier that may identify the transaction, the terminal, the merchant, etc. and provides the terminal token with the image/images and audio recording to the back end.

In one embodiment, a merchant token or identifier that identifies the merchant may also be provided.

In step 425, the back end may determine the content of the voice recording. For example, the back end may analyze the voice recording to identify an issuer or payment provider and an account identifier with that issuer/payment provider.

In one embodiment, the back end may convert the voice recording to text.

Examples of biometric authentication and/or analysis are disclosed in U.S. patent application Ser. No. 13/972,556, U.S. patent application Ser. No. 13/940,799, and U.S. patent application Ser. No. 13/908,618. The disclosures of each of these documents is incorporated, by reference, in its entirety.

In one embodiment, the GPS signal from the individual's electronic device may be used to reduce the number of biometric profiles that are checked. For example, the individual's location may be periodically updated, and only the profiles of individuals within a certain distance of the merchant/terminal are checked.

In another embodiment, the back end may store voice and image/video data for a period of time. In one embodiment, the received biometric data may be checked against this data first.

In another embodiment, the received biometric data may be checked against the voice and image/video data for most frequent customers may be checked first.

In step 430, the back end may authenticate the individual based on the image/images/video and/or voice recording. In one embodiment, the back end may identify the individual based on the captured image/images/video, and may confirm the identity using the voice recording.

In one embodiment, if the authentication fails, the individual may conduct the transaction in another manner, such as by NEC, using a wallet application, using a payment application, etc. In another embodiment, additional biometric data may be collected if the confidence level in the biometric data does not exceed a certain threshold.

In step 435, the back end may retrieve a payment token that it has stored based on the payment instruction. In another embodiment, the back end may generate a payment token. The payment token may be a merchant-specific token, and may be a single use token for the specific transaction.

Other types of payment tokens may be used as is necessary and/or desired.

In another embodiment, the back end may request a payment token from the financial institution. In one embodiment, the back end may communicate authentication information, the terminal token or transaction identifier, the merchant token or identifier, etc. to the financial institution, and the financial institution may generate a payment token, or retrieve a payment token, and provide the payment token to the back end.

In one embodiment, the back end may provide the retrieved payment token to the financial institution, and may receive a replacement payment token from the financial institution.

In step 440, the back end may provide the payment token to the merchant. In one embodiment, the back end may return the terminal token and/or the merchant token with the payment token.

In another embodiment, the back end may not provide the payment token to the merchant. Instead, the back end may provide the terminal token and/or the merchant token with a transaction approval status (e.g., approved, denied) to the merchant. In one embodiment, the terminal token and/or the merchant token may be modified with an approval status and account information. In still another embodiment, the back end may only return a payment message to the merchant.

For example, the transaction token, merchant token and/or payment message may identify the account type used and a unique identifier that the financial institution may use to track the transaction. They may also include the values of the individual's account identified and the original transaction number, merchant identifier, etc. Thus, if the individual decides to cancel or refund the transaction, the merchant may request a refund using this information.

In one embodiment, the merchant may verify that the terminal token, merchant token, or payment instructions were provided from an IP address associated with the financial institution or back end.

In step 445, the transaction may be complete.

Figure 5:
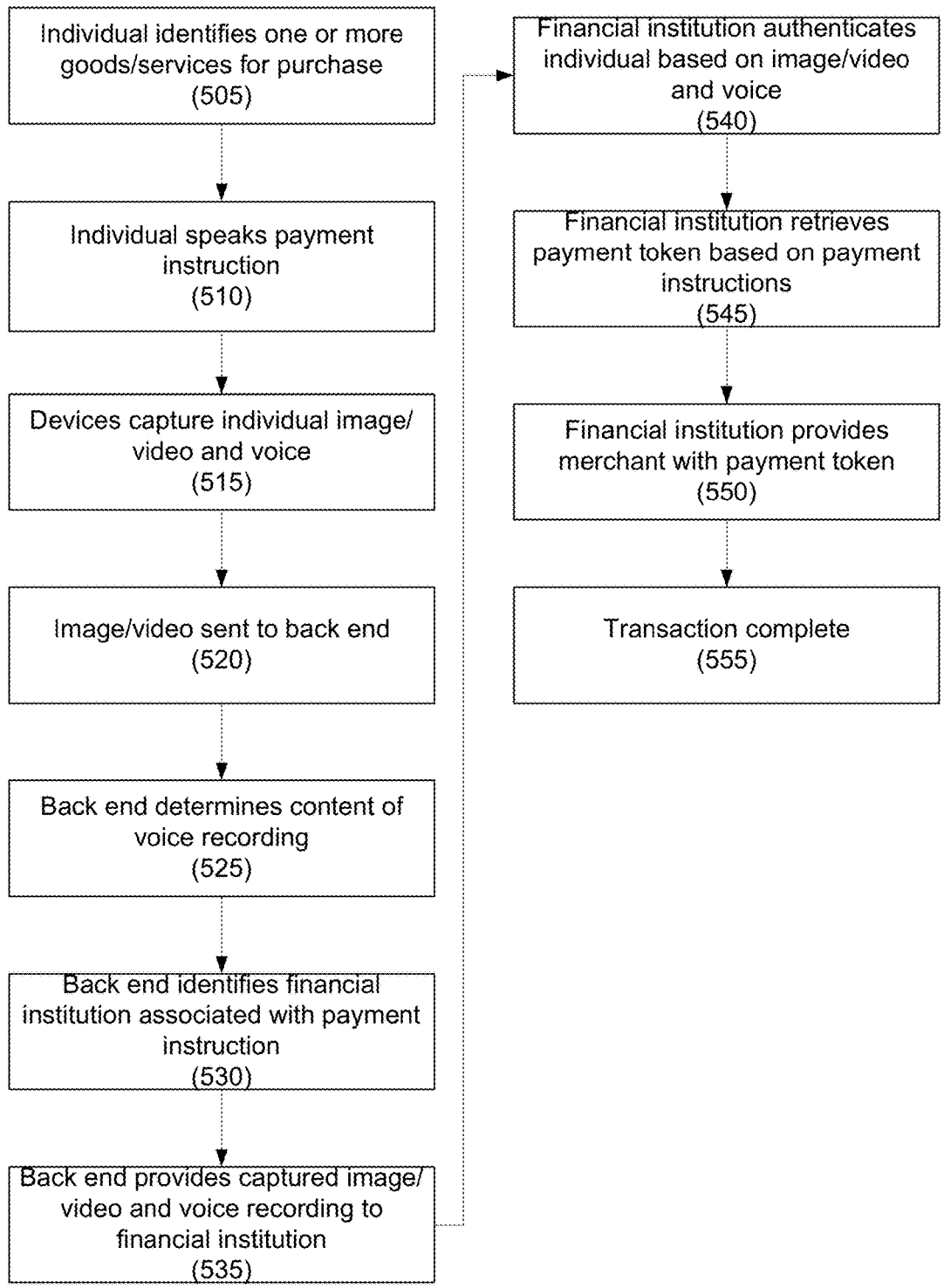
FIG. 5 depicts a method for in-person biometric payment according to another embodiment.

Referring to FIG. 5, a method for in-person biometric payments is disclosed according to another embodiment. Steps 505, 510, 515, 520, and 525 are similar to steps 450, 410, 415, 420, and 425 respectively.

In step 530, the back end may identify a financial institution (e.g., credit card issuer) associated with the payment instruction.

In step 535, the back end may provide the captured image/video and voice data to the financial institution. In one embodiment, the back end may provide the terminal token and/or merchant token to the financial institution.

In step 540, the financial institution may authenticate the individual based on the image/images/video and/or voice recording. In one embodiment, the financial institution may identify the individual based on the captured image/images/video, and may confirm the identity using the voice recording.

In step 545, the financial institution may retrieve a payment token based on the payment instruction. In another embodiment, the financial institution may generate a payment token. The token may be a merchant-specific token, and may be a single use token for the specific transaction. In still another embodiment, the financial institution may modify the terminal token and/or merchant token, or generate a payment message, as described above.

In step 550, the back end may provide the payment token, the terminal token, the merchant token, and/or a payment message to the merchant.

In step 555, the transaction may be complete.

Figure 6:
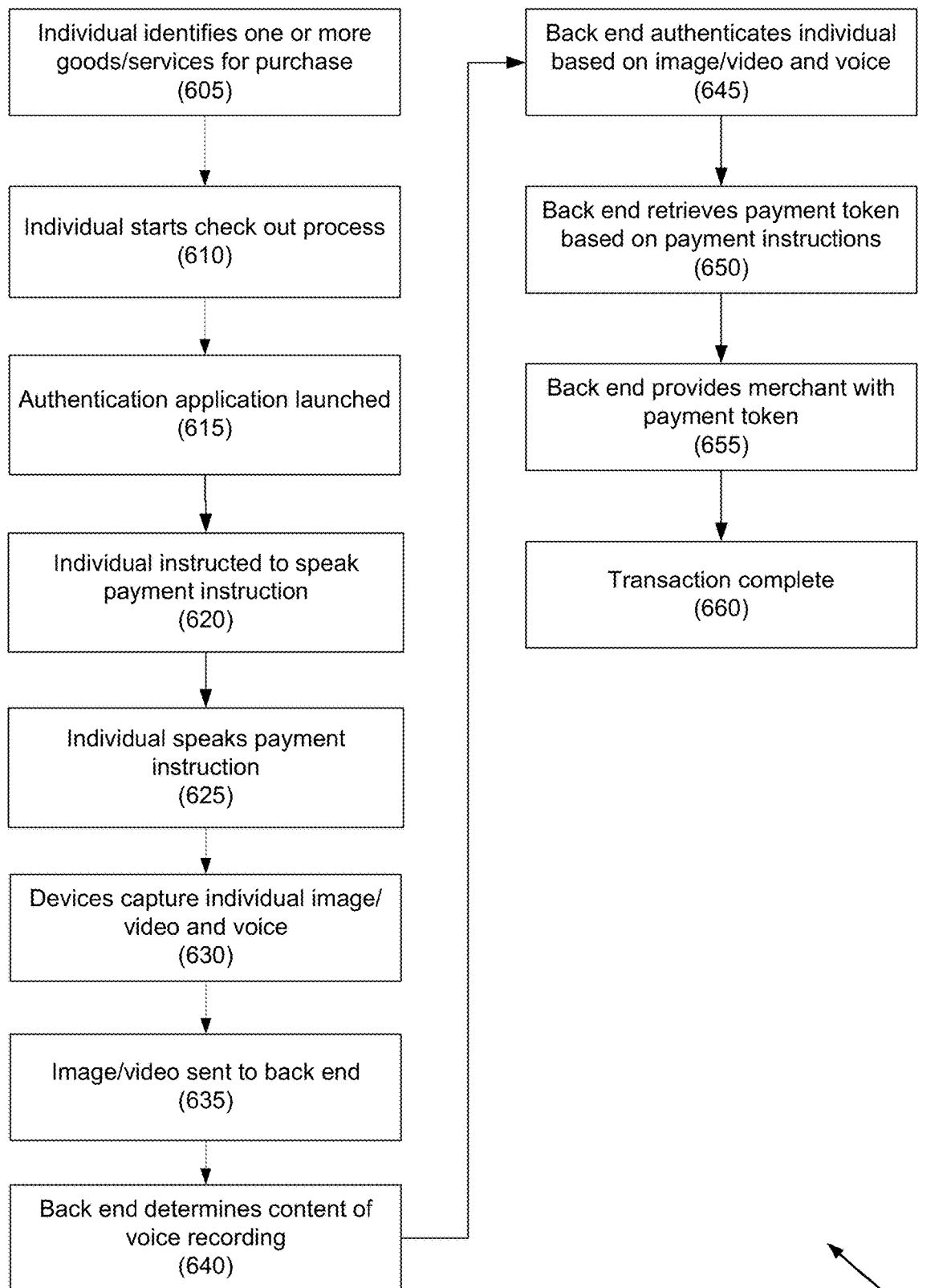
FIG. 6 depicts a method for on-line biometric payment according to another embodiment.

Referring to FIG. 6, a method for biometric payments is disclosed according to another embodiment.

In step 605, an individual may one or more goods and/or services to purchase. In one embodiment, the individual may select one or more item and put the item(s) in the individual's "shopping cart."

In one embodiment, the individual may be shopping on an on-line merchant's website, may be using a mobile payment application, etc.

Examples of mobile payment applications are disclosed in U.S. patent application Ser. No. 14/699,511 and U.S. patent application Ser. No. 14/699,511, the disclosures of each of which is hereby incorporated, by reference, in its entirety.

In step 610, the individual may start the check-out process.

In step 615, a machine-readable code, such as a QR code, may be presented to the individual on, for example, the display for the device. In one embodiment, the individual may scan the code with a mobile device, which may then launch or execute a biometric authentication application.

In another embodiment, if the individual is using a mobile device, an instruction may be sent to the mobile device to launch the biometric authentication application.

In step 620, the biometric authentication application may instruct the individual to speak a payment instruction before a camera/microphone in the mobile device. This may be similar to step 410, above.

In step 625, the individual may speak the payment instruction. This may be similar to step 410, above.

In step 630, the camera and/or microphone in the mobile device may capture the image/plurality of images/video and audio of the individual speaking the payment instruction. This may be similar to step 415, above.

In step 635, the captured image/images/video and audio recording may be provided to the back end. This may be similar to step 420, above.

In step 640, the back end may determine the content of the voice recording. For example, the back end may analyze the voice recording to identify an issuer or payment provider and an account identifier with that issuer/payment provider. In one embodiment, the back end may convert the voice recording to text.

This may be similar to step 425, above.

In step 645, the back end may authenticate the individual based on the image/images/video and/or voice recording. In one embodiment, the back end may identify the individual based on the captured image/images/video, and may confirm the identity using the voice recording. This may be similar to step 430, above.

In step 650, the back end may retrieve a stored payment token based on the payment instruction. In another embodiment, the back end may generate a payment token. The token may be a merchant-specific token, and may be a single use token for the specific transaction.

Other types of tokens may be used as is necessary and/or desired.

In another embodiment, the back end may request a payment token from the financial institution. In one embodiment, the back end may communicate authentication information, transaction information, the terminal token, the merchant token, etc. to the financial institution, and the financial institution may generate or retrieve the payment token, and provide the payment token to the back end.

In another embodiment, the financial institution may modify the terminal token and/or merchant token, or generate a payment message, as described above.

This may be similar to step 545, above.

In step 655, the back end may provide the payment token, the terminal token, the merchant token, and/or payment instructions to the merchant. This may be similar to step 440, above.

In step 660, the transaction may be complete. This may be similar to step 445, above.

Figure 7:
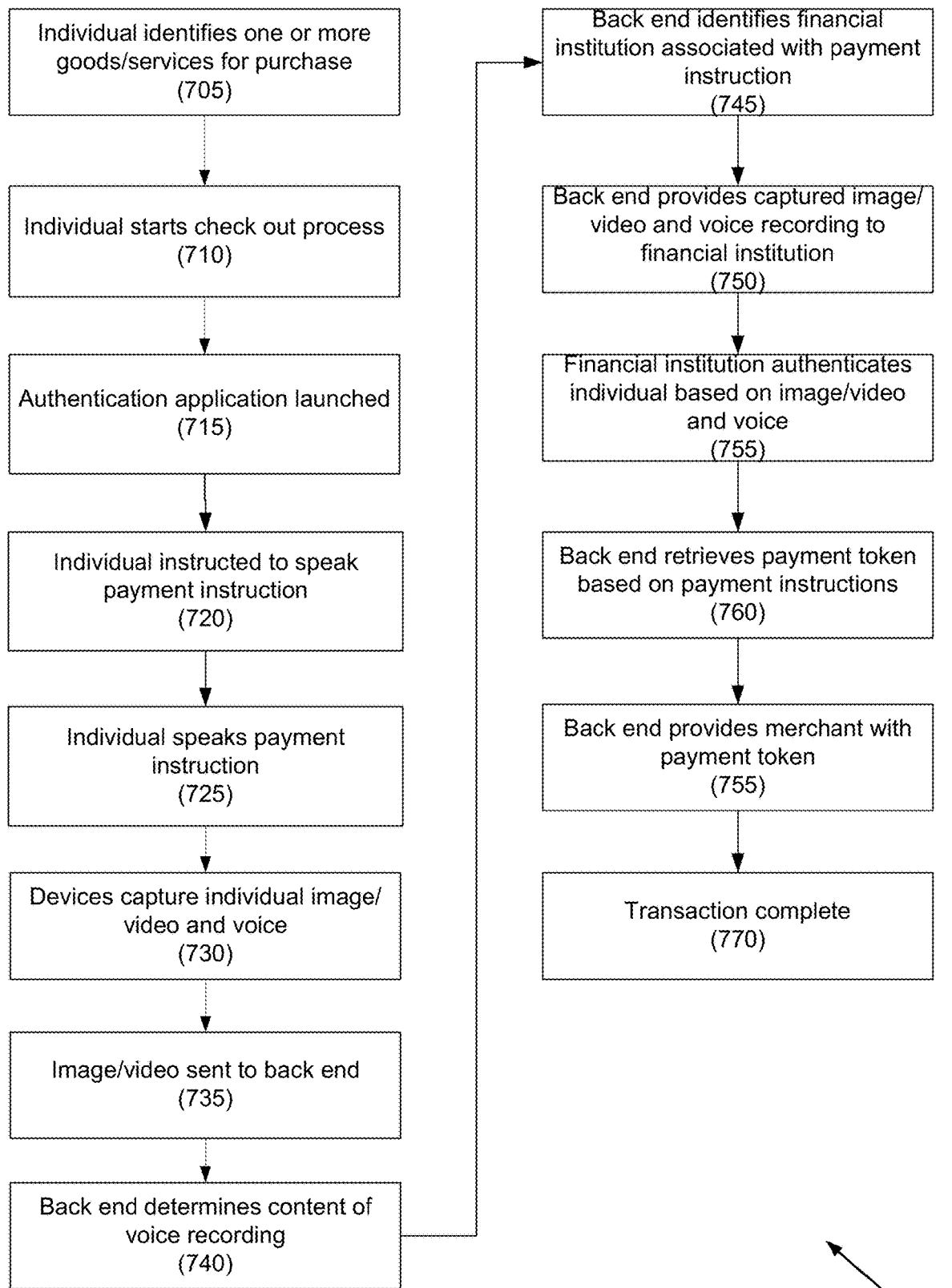
FIG. 7 depicts a method for on-line biometric payment according to another embodiment.

Referring to FIG. 7, a method for biometric payments is disclosed according to another embodiment.

In step 705, an individual may one or more goods and/or services to purchase. This may be similar to step 605, above.

In step 710, the individual may start the check-out process. This may be similar to step 610, above.

In step 715, an authentication application may be launched or executed. This may be similar to step 715, above.

In step 720, the biometric authentication application may instruct the individual to speak a payment instruction before a camera in the mobile device. This may be similar to step 410, above.

In step 725, the individual may speak the payment instruction. This may be similar to step 710, above.

In step 730, the camera and/or microphone in the mobile device may capture the image/plurality of images/video and audio of the individual speaking the payment instruction. This may be similar to step 715, above.

In step 735, the captured image/images/video and audio recording may be provided to the back end. This may be similar to step 720, above.

In step 740, the back end may determine the content of the voice recording. This may be similar to step 425, above.

In step 745, the back end may identify a financial institution (e.g., credit card issuer) associated with the payment instruction. This may be similar to step 530, above.

In step 750, the back end may provide the captured image/video and voice data, the terminal token, the merchant token, etc. to the financial institution. This may be similar to step 535, above.

In step 755, the financial institution may authenticate the individual based on the image/images/video and/or voice recording. This may be similar to step 540, above.

In step 760, the financial institution may retrieve or generate a payment token based on the payment instruction. In step 550, the back end may provide the token to the merchant.

In step 770, the transaction may be complete. This may be similar to step 555, above.

Figure 8:
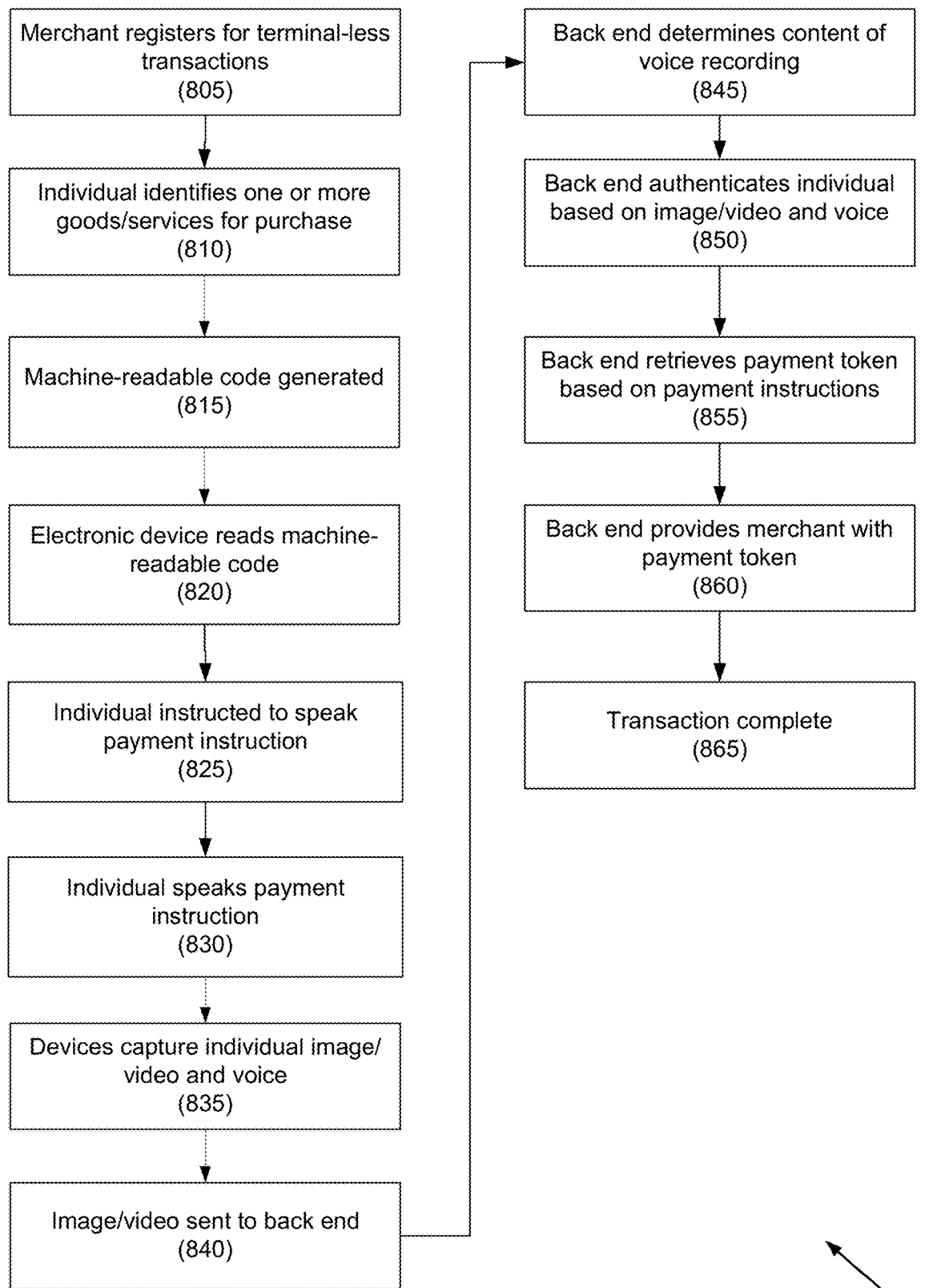
FIG. 8 depicts a method for biometric payment according to one embodiment.

Referring to FIG. 8, a method for in-person biometric payments without using a terminal is disclosed according to one embodiment. In step 805, the merchant may register with the back end, and may indicate that it will not use a terminal for some, or all, payments.

In one embodiment, the merchant may use an electronic device, such as any suitable computer (e.g., desktop, notebook tablet, etc.), smart phone, etc. as the terminal.

In step 810, an individual may identify one or more goods and/or services to purchase. In one embodiment, the merchant may enter the goods/services into the merchant's electronic device.

In one embodiment, the transaction may be initiated using the individual's electronic device. For example, an identifier may be provided to the merchant's device using, for example, NFC, in order to identify an account.

In step 815, the back end or merchant may generate a machine readable code for the individual's mobile device to read. In one embodiment, the machine-readable code may be a QR code. Other codes may be used as is necessary and/or desired.

In one embodiment, the machine readable code may identify the merchant and may provide a link to an authentication site.

In step 820, the individual may read the machine-readable code with his or her mobile device.

In step 825, the individual may be instructed to speak a payment instruction before a camera/microphone in the mobile device. This may be similar to step 410, above.

In step 830, the individual may speak the payment instruction. This may be similar to step 410, above.

In step 835, the camera and/or microphone in the mobile device may capture the image/plurality of images/video and audio of the individual speaking the payment instruction. This may be similar to step 415, above.

In step 840, the captured image/images/video and audio recording may be provided to the back end. This may be similar to step 420, above.

In step 845, the back end may determine the content of the voice recording. For example, the back end may analyze the voice recording to identify an issuer or payment provider and an account identifier with that issuer/payment provider. In one embodiment, the back end may convert the voice recording to text.

This may be similar to step 425, above.

In step 850, the back end may authenticate the individual based on the image/images/video and/or voice recording. In one embodiment, the back end may identify the individual based on the captured image/images/video, and may confirm the identity using the voice recording. This may be similar to step 430, above.

In another embodiment, the financial institution may authenticate the individual.

In one embodiment, if the individual cannot be authenticated, the individual may pay using another mechanism, such as NFC, on-line payment, email payment, etc.

In step 855, the back end may retrieve a stored payment token based on the payment instruction. In another embodiment, the back end may generate a payment token. The token may be a merchant-specific token, and may be a single use token for the specific transaction.

Other types of tokens may be used as is necessary and/or desired.

In another embodiment, the back end may request a payment token from the financial institution. In one embodiment, the back end may communicate authentication information to the financial institution, and the financial institution may generate or retrieve the payment token, and provide the payment token to the back end.

In another embodiment, the financial institution may generate a payment message. This may be similar to step 545, above.

In step 860, the back end may provide the payment token and/or payment instructions to the merchant. This may be similar to step 440, above.

In step 865, the transaction may be complete. This may be similar to step 445, above.

Figure 9:
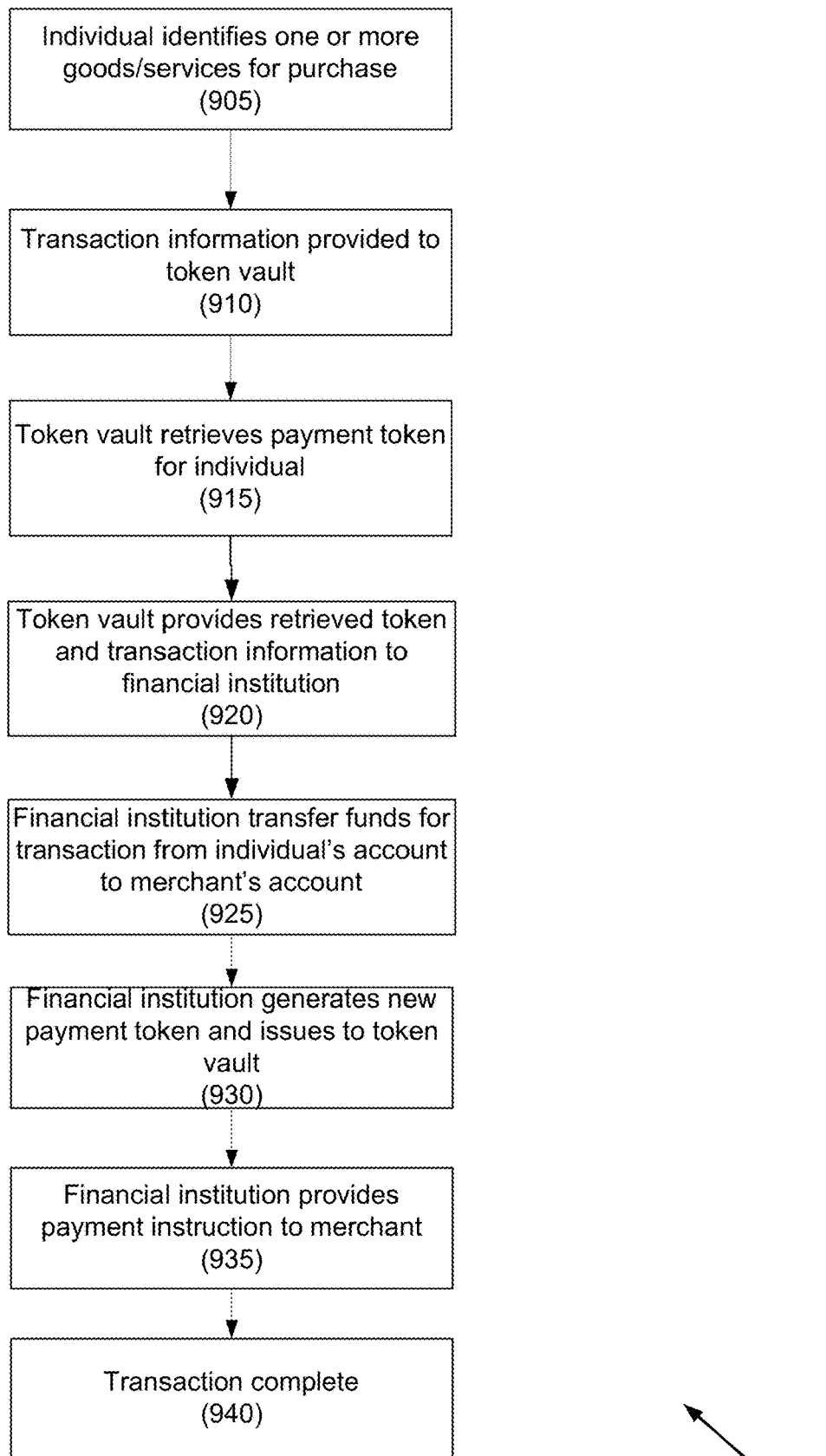
FIG. 9 depicts a token payment process according to one embodiment.

Referring to FIG. 9, a method for payment using tokens is disclosed. It should be noted that this method may be used with any of the embodiments described above.

In step 905, an individual may one or more goods and/or services to purchase. This may be similar to step 705, above.

In step 910, transaction information may be provided to a token vault. In one embodiment, the transaction information may include, for example, a terminal token or identifier, a merchant token or identifier, a transaction amount, etc. It may also include identification information for the individual (e.g., biometrics, etc.).

In step 915, the token vault may retrieve a stored payment token for the individual. In one embodiment, the token vault may authenticate the individual before retrieving the payment token.

In step 920, the token vault may provide the retrieved payment token and the transaction information to the financial institution.

In step 925, the financial institution may approve the transaction and may transfer funds from the individual's account to the merchant's account.

In step 930, the financial institution may generate a new payment token and may issue the payment token to the token vault.

In step 935, the financial institution may provide payment instructions to the merchant. As discussed above, the terminal token and/or the merchant token may be modified with a transaction approval status (e.g., approved, denied), account information (e.g., last four digits of card number), value of the account, etc. In still another embodiment, the back end may only return a payment message to the merchant.

In step 940, the transaction may be complete.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by an individual or individuals of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ 10 operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for conducting biometric payments comprising:
   receiving, by a merchant backend comprising at least one computer processor, transaction information from a merchant terminal comprising an identification of a good or service to purchase;
   receiving, from a mobile electronic device associated with an individual, a spoken payment phrase from the individual captured by a microphone on the mobile electronic device;
   extracting, by the merchant backend, a voice biometric from the spoken payment phrase;
   identifying and authenticating, by the merchant backend, the individual by matching the extracted voice biometric to a registered voice biometric in a database of registered voice biometrics;
   identifying, by the merchant backend, a payment account from the spoken payment phrase;
   requesting, by the merchant backend, a payment token for the payment account from an issuer;
   receiving, by the merchant backend, the payment token from the issuer; and
   providing, by the merchant backend, the payment token to the merchant terminal.

2. The method of claim 1, wherein the transaction information further comprises at least one of a terminal identifier and a merchant identifier.

3. The method of claim 1, wherein the spoken payment phrase further comprises video of the individual speaking the spoken payment phrase.

4. The method of claim 3, wherein the video comprises a plurality of images.

5. The method of claim 1, further comprising:
receiving, by the merchant backend, a location of the merchant terminal; and
receiving, by the merchant backend, a GPS signal from a plurality of mobile electronic devices including a mobile electronic device of the individual;
wherein the merchant backend further authenticates the individual based on the location of the merchant terminal and a current GPS signal of the mobile electronic device.

6. The method of claim 1, further comprising:
receiving, by the merchant backend, an image of the individual;
wherein the merchant backend further identifies and authenticates the individual based on the image of the individual.

7. An electronic device, comprising:
a computer processor; and
a memory storing a backend computer program;
wherein the backend computer program is configured to:
receive transaction information from a merchant terminal comprising an identification of a good or service to purchase;
receive, from a mobile electronic device associated with an individual, a spoken payment phrase from the individual captured by a microphone on the mobile electronic device;
extract a voice biometric from the spoken payment phrase;
identify and authenticate the individual matching the extracted voice biometric to a registered voice biometric in a database of registered voice biometrics;
identify a payment account from the spoken payment phrase;
request a payment token for the payment account from an issuer of the payment account;
receive the payment token from the issuer; and
provide the payment token to the merchant terminal.

8. The electronic device of claim 7, wherein the transaction information further comprises at least one of a terminal identifier and a merchant identifier.

9. The electronic device of claim 7, wherein the spoken payment phrase further comprises video of the individual speaking the spoken payment phrase.

10. The electronic device of claim 9, wherein the video comprises a plurality of images.

11. The electronic device of claim 7 wherein the backend computer program is configured to:
receiving a location of the merchant terminal;
receiving a GPS signal from a plurality of mobile electronic devices including a mobile electronic device of the individual; and
authenticate the individual based on the location of the merchant terminal and a current GPS signal of the mobile electronic device.

12. The electronic device of claim 7 wherein the backend computer program is configured to:
receive an image of the individual; and
identify and authenticate the individual based on the image of the individual.

* * * * *